Jan. 6, 1970  J. W. WILLEY  3,487,794
TRASH BURNER
Filed Feb. 23, 1968  2 Sheets-Sheet 1
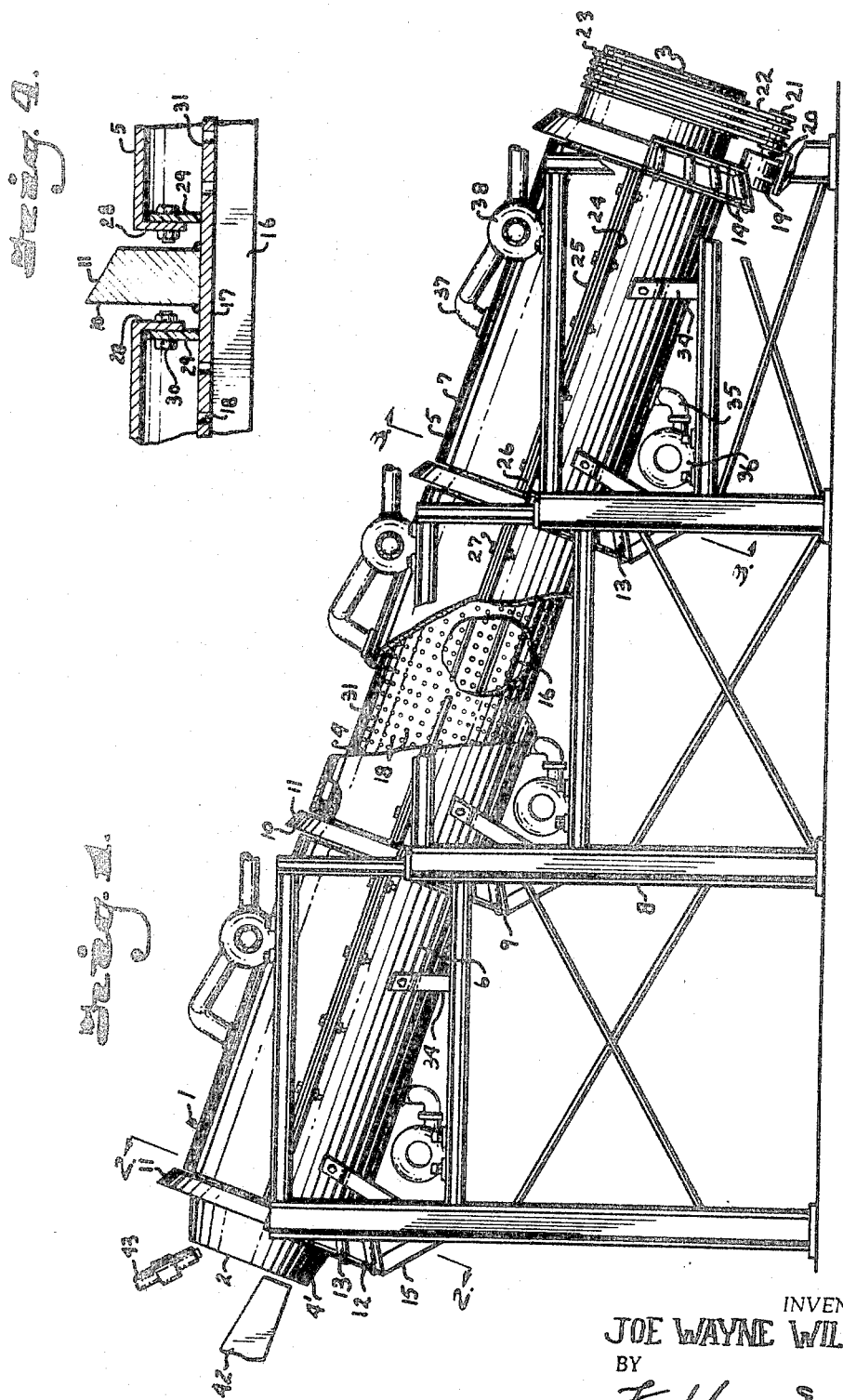
INVENTOR.
JOE WAYNE WILLEY
BY
ATTORNEYS Jan. 6, 1970

J. W. WILLEY 3,487,794

TRASH BURNER

Filed Feb. 23, 1968

INVENTOR.
JOE WAYNE WILLEY
BY
*Fishburn & Gold*
ATTORNEYS

United States Patent Office 3,487,794
Patented Jan. 6, 1970

3,487,794
TRASH BURNER
Joe Wayne Willey, 507 S. Cedar, Belton, Mo. 64012
Filed Feb. 23, 1968, Ser. No. 707,709
Int. Cl. F23g 5/06; F27b 7/36
U.S. Cl. 110—14                                    6 Claims

ABSTRACT OF THE DISCLOSURE

An inclined rotary elongate perforated cylindrical incinerator tube with vanes arranged longitudinally therein to lift and agitate trash and aid its gradual downward movement from an inlet and toward an ash discharge end, said incinerator tube being enclosed in stationary outside shells divided into a lower and upper jacket separated by seals in contact with said incinerator tube to form lower air chambers, to receive air under pressure from air blowers, and upper air chambers, to receive combustion gases and smoke from the incinerator tube. Air is forced from the lower air chambers into the incinerator tube through a plurality of longitudinally and radially spaced perforations to aerate the trash and aid its combustion, said combustion gases and smoke being removed by air suction devices and delivered to suitable disposal means or recirculated into the lower air chambers.

---

The principal objects of my invention are to provide a trash burner having an inclined incinerator tube with a novel and efficient means of controlling air supply thereto in burning trash; to provide such a trash burner tube surrounded by a shell defining air chambers therebetween, and openings in the tube for flow of air and gases to and from same; to provide a controlled volume of air to cool the equipment parts in contact with the flame or burning material; to provide a trash burner producing a low amount of unconsumed residue at the outlet end; to provide a method of agitation of the trash which aids its combustion and its gradual downward movement in the incinerator tube; to provide an incinerator or trash burner of large capacity that is economical and durable in operation and that is composed of standardized components of a limited number which are easily and quickly removed and replaced during maintenance or repair operations; and to provide an improved and more complete and efficient method of trash burning.

Other objects and advantages of this invention will become apparent from the following description taken in connection with the accompanying drawings wherein are set forth by way of illustration and example certain embodiments of this invention.

FIG. 1 is a side elevation of a trash burner embodying the present invention with portions broken away to show the inner perforated rotary incinerator tube with material moving members therein.

FIG. 4 is a detail of portions of the tube and shells showing the end flanges and end seals.

Figure 3:
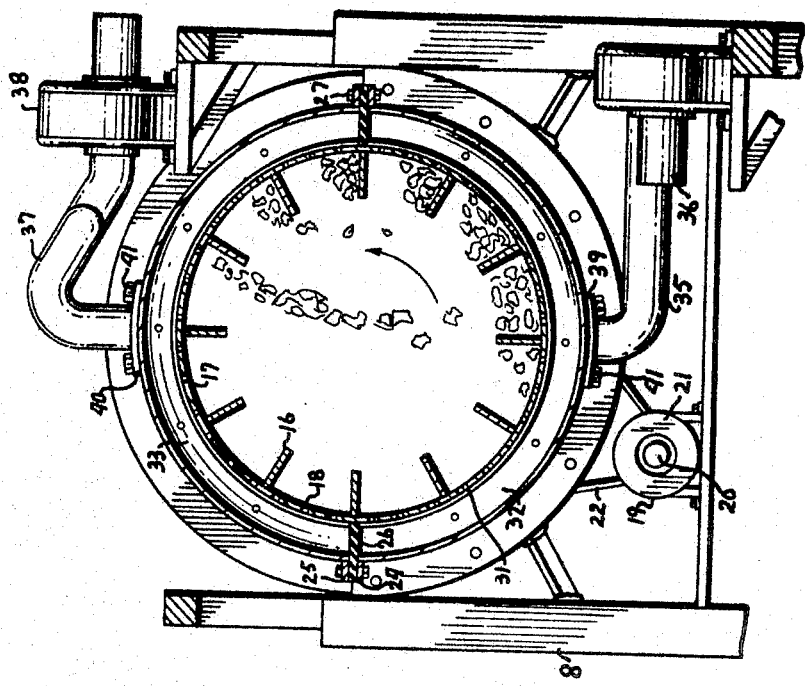
FIG. 3 is a transverse sectional view through the trash burner taken on line 3—3, FIG. 1.
Figure 2:
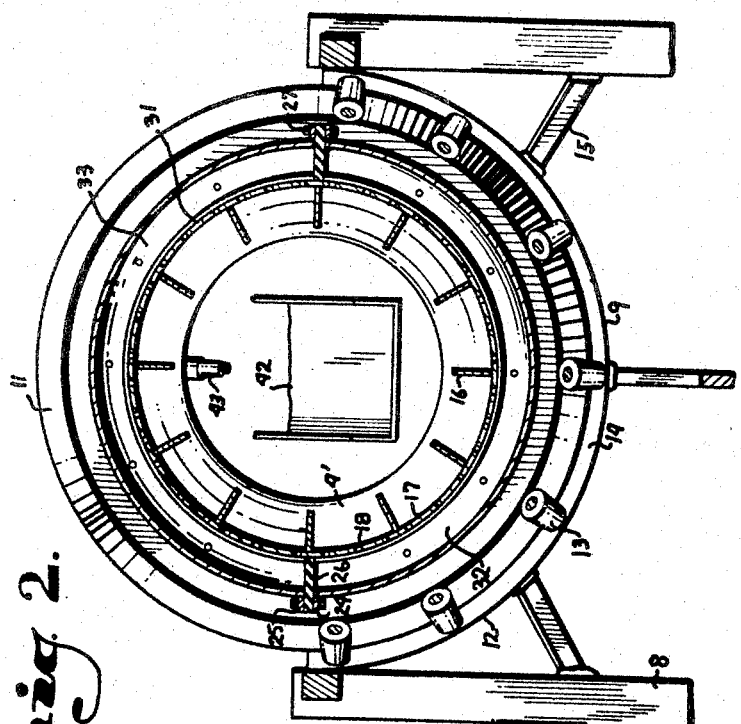
FIG. 2 is a transverse sectional view through the trash burner adjacent the inlet end thereof taken on line 2—2, FIG. 1.

Referring more in detail to the drawings:

The reference numeral 1 generally designates the trash burner embodying the present invention adapted to receive various forms of trash and burn same with a minimum of residue. In the structure illustrated, the trash burner includes an inclined generally cylindrical burner structure with a trash inlet end 2 and a reside or ash outlet end 3 between which trash moves downwardly as it burns. The trash burner 1 has an elongated inner rotary incinerator tube 4 substantially enclosed in a shell 5 which, in the illustrated form, is tandem sets of lower outside jackets 6 and upper outside jackets 7. The trash burner 1 is supported on a suitable base or frame such as a steel fabricated frame structure 8.

The inclined incinerator tube 4 is preferably supported in saddles 9 or the like permitting rotation about its longitudinal axis while preventing downward or sideward movement thereof. In the structure illustrated the tube 4 is substantially cylindrical for the length thereof with an inwardly tapered portion 4' at the inlet end forming a reduced inlet opening to facilitate trash fed into the tube remaining therein. The tube 4 has a plurality of longitudinally spaced rings or tires 10 extending therearound, with each tire having an outer beveled or inclined peripheral face 11 on its periphery facing generally toward the outlet end 3. The faces 11 are shown with each being at a 45 degree angle relative to the longitudinal axis of the incinerator tube 4, however, the angle may be any suitable angle to support the load and thrust. The saddles 9 have suitable bearing members 12 engaged by the tires 10 and in the structure shown said bearing members each have a plurality of rollers 13 engaging the beveled face 11 of the respective tire 10. The rollers 13 face upwardly and outwardly at an angle complementary to the angle of the faces 11 relative to the longitudinal axis of said incinerator tube 4. The saddles 9 include spaced members 14 which rotatably support the rollers 13 therebetween with said saddles mounted on the structure 8 as by a plurality of struts or braces 15.

The incinerator tube 4 is an elongate cylindrical tube having a plurality of circumferentially spaced vanes 16 extending from the inner surface 17 thereof. The vanes 16 are arranged longitudinally of the tube 4 and may be in series or continuous from the trash inlet end 2 to the residue or ash outlet end 3. The incinerator tube 4 has a plurality of small perforations 18 in the wall between the support rings or tires 10, said perforations 18 being such that trash particles do not pass therethrough. The perforations are of such quantity as to pass air and gases therethrough to support burning of the trash and with some velocity to aid in keeping the trash moving as later described.

The inclined incinerator tube 4 is rotated by a suitable prime mover such as motor 19 having an operative connection therewith. The speed of rotation of tube is slow so a suitable drive reduction is provided by a reduction gearing or the like. In the structure illustrated, the motor 19 is a geared motor and rotates a drive shaft 20 having a drive pulley or sprocket 21 thereon operatively connected with the tube by a plurality of endless chains or belts 22. The tube 4 has an annular pulley or sprocket structure 23 adjacent the outlet end 3 that is drivingly engaged by the endless belts or chains 22 to rotate the tube 4 in the saddles 9. The drive mechanism is preferably located at the outlet end 3 because it is easily accessible and the temperatures may be lower there than at other locations in the inclined trash burner 1.

The jackets 6 and 7 are connected together to surround the respective tube portion and the lower and upper outside jackets 6 and 7 have diametrically opposed longitudinal flanges 24 and 25 respectively. The jackets form a shell that provides lower and upper air chambers which are separated by partitions 26. In the structure illustrated, the partitions are diametrically opposed longitudinal seals of suitable flexible heat-resistant material, such as asbestos or the like. The flanges 24 and 25 and the partitions 26 are joined together by suitable fasteners such as bolts 27. The lower outside jackets 6 and upper outside jackets 7 have end flanges 28 at each end of the respective jacket. When the lower and upper jackets are in place the end flanges 28 form an annular ring adjacent the tires 10 and end seals 29 of suitable heat-resistant material are connected to the flanges by suitable fasteners such as bolts 30.

When the longitudinal seals 26 and the end seals 29 are in place and the jackets surround the tube 4 said seals have inner edges in contact with the outside face 31 of the incinerator tube 4, lower air chambers 32 and upper air chambers 33 are formed. The respective air chambers are being relatively air tight so the air and gases pass to and from the tube. Each of the shells are supported from the frame and are shown with the lower outside jackets 6 being suitably supported on the structure 8 as by a plurality of struts or braces 34. Each of the upper outside jackets 7 is supported on its respective lower outside jacket 6 and fastened thereto as by the bolts 27.

Air is delivered to the lower chambers 32 for flow in to the tube 4 to support burning of trash. While a single air supply could be used separate supplies are shown and preferred as it facilitates quantity and velocity control. As shown each lower outside jacket is connected to a respective air supply duct 35 and an air blower 36 for air supply thereby. Combustion gases are suitably removed and it is preferred that rather than passing them through a stack a controlled removal be used. The upper chambers 33 are exhausted through discharge ducts 37 which are connected to suction pumps 38 for delivery of said gases to a disposal or smoke abatement device (not shown). The ducts 35 and 37 are provided with flanges 39 and 40 respectively which are suitably connected to the respective jackets as by bolts 41. The air blower 36 and the air suction pump 38 may be arranged as desired and are shown supported on the structure 8.

In operating a trash burner constructed and assembled as described, trash is introduced into the trash burner 1 at the trash inlet end 2 of the incinerator tube 4 from a suitable delivery means such as chute 42. Trash in the inlet end 2 is ignited by a flame jet from a suitable burner 43 directed in to said inlet. The motor 19 is energized to rotate the tube 4 on the rollers 13 and the engagement thereof with the tires 10 retaining the tube in operative position. As the tube is rotated the vanes 16 on the inside of the incinerator tube 4 continually lift the trash toward the top of said incinerator tube 4 where it falls to the bottom of said tube. Due to the incline of the incinerator tube 4 each time the trash falls to the bottom of the incinerator tube 4 it falls slightly nearer the ash or outlet end 3. Thus, the trash gradually moves down the inclined incinerator tube 4 toward the outlet end 3. The vanes 16 also serve to aerate and aigtate the trash, and aid its combustion by exposing additional surfaces to the flames.

A controlled volume of air is supplied to the trash burner 1 through each shell section by respective air blowers 36 the air passing into the semi-circular chambers 32 and through the perforations in to adjacent trash. Combustion gases and smoke are drawn from the trash burner 1 by air suction pumps 38. The air blowers 36 force air, which may be preheated, through respective air supply ducts 35 into each of the lower air chambers 32 and this air passes with some velocity from each lower air chamber 32 into the incinerator tube 4 by means of the perforations 18 in the lower half so the air tends to prevent any small particles from blacking the perforations on passing therethrough. Air thus introduced into the incinerator tube 4 aerates the trash and further aids its combustion. Smoke and combustion gases are drawn from the incinerator tube 4 through perforations 18 into each upper air chamber 33, and then are drawn therefrom through a respective air discharge duct 37 to an air suction pump 38 and discharged to suitable smoke eliminators (not shown) or to an air blower to recirculate the smoke and combustion gases to provide more efficient and complete burning of the trash. Air supply velocity into each of the lower air chambers may be varied as is necessary to aid combustion of the trash while adjacent to the respective lower air chamber. The cylindrical shell 5 between a pair of support rings or tines 10 forms a complete unit having an air supply duct 35, an air blower 36, a lower air chamber 32, an upper air chamber 33, an air discharge duct 37, and an air suction pump 38. The tapered section 4' at the trash inlet end 2 serves to restrict the escape of air combustion gases and smoke from the incinerator tube 4.

It is believed obvious that the inclined trash burner of my invention provides controlled air supply and circulation cooling the parts in contact with the flame and aiding combustion of the trash.

It is to be understood that while I have illustrated and described one form of my invention, it is not to be limited to the specific form or arrangement of parts herein described and shown.

What I claim and desire to secure by Letters Patent is:
1. A trash burner apparatus comprising,
  (a) an elongate tubular member defining a combustion chamber through which trash progresses gradually from an inlet end to an outlet end during burning, said tubular member having a plurality of air openings spaced therearound and for a substantial portion of the length thereof,
  (b) a support structure,
  (c) means on said support structure rotatably mounting said tubular member in inclined relation with the inlet end at the higher elevation,
  (d) drive means having operating engagement with the tubular member for rotating said tubular member on its longitudinal axis,
  (e) a fire producing means adjacent said inlet end for igniting trash introduced therein,
  (f) a shell surrounding said tubular member and having substantially diametrical separation portion engaging same and longitudinally spaced separation portions engaging said tubular member to define a plurality of upper chambers and a plurality of lower chambers, respectively, that communicate with the combustion chamber through the air openings in the respective portions of the tubular member associated therewith,
  (g) means introducing air under pressure through the lower gaseous fluid chambers for movement through air openings in a lower portion of the tubular member and under trash therein to the combustion chamber to support combustion of the trash therein,
  (h) suction means communicating with the upper chambers for withdrawing gaseous fluid therefrom and effecting flow of products of combustion from the combustion chamber through the openings in the tubular member communicating with said upper chambers.

2. A trash burner apparatus as set forth in claim 1 wherein the tubular member has a plurality of annular tire means extending therearound and spaced longitudinally thereof and having inclined peripheries generally facing toward the outlet end of the tubular member, said support structure having saddles spaced thereon with bearing members engaging the periphery of the respective tire means to rotatably mount the tubular member and retain it against gravitational endwise movement.

3. A trash burner apparatus as set forth in claim 2 wherein the shell surrounding the tubular member consists of sections with each section extending substantially the length between adjacent tire means and the air introducing means and suction means connect with the lower and upper chambers in said sections with the output to each being variable.

4. A trash burner apparatus as set forth in claim 3 wherein the bearing means on the saddles are a plurality of spaced rollers.

5. A trash burner apparatus as set forth in claim 4 wherein the tubular member has a plurality of circumferentially spaced inwardly extending vanes for engaging trash and elevating same as the tubular member is rotated, and the drive means has the operative engagement with the tubular member adjacent the outlet end thereof.

6. A trash burner apparatus comprising,
(a) an elongate tubular member defining a combustion chamber through which trash progresses gradually from an inlet end to an outlet end during burning, said tubular member having a plurality of air openings spaced therearound and for a substantial portion of the length thereof,
(b) a support structure,
(c) means on said support structure rotatably mounting said tubular member in inclined relation with the inlet end at the higher elevation,
(d) drive means having operating engagement with the tubular member for rotating said tubular member on its longitudinal axis,
(e) a fire producing means adjacent said inlet end for igniting trash introduced therein,
(f) a plurality of circumferentially spaced inwardly extending vanes fixed in the tubular member for engaging trash and elevating same as the tubular member is rotated,
(g) a shell surrounding said tubular member and having separation portions including longitudinally extending substantially diametrical separations to define an upper gaseous fluid chamber and a lower gaseous fluid chamber that communicate with the combustion chamber though air openings in the respective portion of the tubular member associated therewith,
(h) means introducing air under pressure to the lower gaseous fluid chamber for movement through the air openings in the lower portion of the tubular member and under trash therein to the combustion chamber to support combustion of the trash therein,
(i) means communicating with the upper chamber for withdrawing gaseous fluid therefrom and effecting flow of product of combustion from the combustion chamber through the openings in the tubular member communicating with the said upper chamber.

References Cited

UNITED STATES PATENTS

| 1,303,209 | 5/1919 | King et al. | 34—129 |
| 1,583,436 | 5/1926 | Atkinson | 110—14 |
| 1,697,268 | 1/1929 | Evesmith | 110—14 X |
| 1,835,147 | 12/1931 | Drew | 110—14 |
| 1,885,845 | 11/1932 | Lindhard | 263—32 |
| 2,238,161 | 4/1941 | Drew et al | 110—14 |
| 3,152,796 | 10/1964 | Ramstack | 110—14 X |

FOREIGN PATENTS 691,522  5/1953  Great Britain.

KENNETH W. SPRAGUE, Primary Examiner

U.S. Cl. X.R.

263—32